United States Patent
Park et al.

(10) Patent No.: US 12,026,611 B2
(45) Date of Patent: Jul. 2, 2024

(54) METHOD AND APPARATUS FOR QUANTIZING PARAMETERS OF NEURAL NETWORK

(71) Applicant: Samsung Electronics Co., Ltd., Suwon-si (KR)

(72) Inventors: Hyunsun Park, Seoul (KR); Junhaeng Lee, Hwaseong-si (KR); Shinhaeng Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1160 days.

(21) Appl. No.: 16/426,744

(22) Filed: May 30, 2019

(65) Prior Publication Data
US 2020/0125947 A1    Apr. 23, 2020

(30) Foreign Application Priority Data
Oct. 17, 2018    (KR) .................. 10-2018-0123927

(51) Int. Cl.
*G06N 3/08*    (2006.01)
*G06N 5/04*    (2023.01)

(52) U.S. Cl.
CPC ............. *G06N 3/08* (2013.01); *G06N 5/04* (2013.01)

(58) Field of Classification Search
CPC .......... G06N 3/08; G06N 3/04; G06N 3/0445; G06N 3/0454; G06N 3/0481; G06N 3/063; G06N 5/04
See application file for complete search history.

(56) References Cited

U.S. PATENT DOCUMENTS

| 2002/0181580 A1 | 12/2002 | Van Der Schaar |
| 2016/0328645 A1* | 11/2016 | Lin .......................... G06N 3/08 |
| 2016/0328646 A1 | 11/2016 | Lin et al. |
| 2016/0328647 A1 | 11/2016 | Lin et al. |
| 2016/0342890 A1 | 11/2016 | Young |
| 2016/0342891 A1 | 11/2016 | Ross et al. |
| 2016/0350645 A1 | 12/2016 | Brothers et al. |
| 2016/0358069 A1 | 12/2016 | Brothers et al. |
| 2016/0379115 A1 | 12/2016 | Burger et al. |

(Continued)

FOREIGN PATENT DOCUMENTS

| CN | 1321398 A | 11/2001 |
| CN | 103026705 A | 4/2013 |

(Continued)

OTHER PUBLICATIONS

A. Arthurs and J. Di, "Overflow Detection and Correction in a Fixed-Point Multiplier," 2007 IEEE Region 5 Technical Conference, 2007, pp. 81-85, doi: 10.1109/TPSD.2007.4380356. (Year: 2007).*

(Continued)

*Primary Examiner* — Brent Johnston Hoover
(74) *Attorney, Agent, or Firm* — NSIP Law

(57) ABSTRACT

A method of quantizing parameters of a neural network includes calculating, for each of the parameters, a bit shift value indicating a degree outside a bit range of a fixed-point format for quantizing the parameters, updating the fixed-point format based on the calculated bit shift values of the parameters, and quantizing parameters updated in a learning or inference process according to the updated fixed-point format.

27 Claims, 12 Drawing Sheets

(56) References Cited

U.S. PATENT DOCUMENTS

| | | | |
|---|---|---|---|
| 2017/0064317 A1 | 3/2017 | Alshina et al. | |
| 2017/0220929 A1 | 8/2017 | Rozen et al. | |
| 2017/0270408 A1 | 9/2017 | Shi et al. | |
| 2017/0372202 A1 | 12/2017 | Ginsburg et al. | |
| 2018/0032866 A1 | 2/2018 | Son et al. | |
| 2018/0082181 A1 | 3/2018 | Brothers et al. | |
| 2018/0107451 A1 | 4/2018 | Harrer et al. | |
| 2018/0211152 A1* | 7/2018 | Migacz | G06N 3/08 |
| 2019/0251424 A1 | 8/2019 | Zhou et al. | |
| 2019/0265949 A1* | 8/2019 | Ito | G06N 3/063 |
| 2019/0339939 A1 | 11/2019 | Ito et al. | |

FOREIGN PATENT DOCUMENTS

| | | | | |
|---|---|---|---|---|
| CN | 108345939 A | 7/2018 | | |
| CN | 108364061 A | 8/2018 | | |
| JP | 2018-124681 A | 8/2018 | | |
| KR | 10-2016-0142791 A | 12/2016 | | |
| WO | WO 2018/140294 A1 | 8/2018 | | |
| WO | WO-2018140294 A1 * | 8/2018 | | G06N 3/063 |

OTHER PUBLICATIONS

Chen et al., "FxpNet: Training a Deep Convolutional Neural Network in Fixed-Point Representation", Jul. 3, 2017, 2017 International Joint Conference on Neural Networks (IJCNN), pp. 2494-2501. (Year: 2017).*

Shawash, Janti, "Generalised Correlation Higher Order Neural Networks, Neural Network operation and Levenberg-Marquardt training on Field Programmable Gate Arrays", *Department of Electronic and Electrical Engineering University College London*, Jan. 2012, pp. 1-155.

Flores, Beatriz Carcelen, "Pre-Distortion Algorithms Implemented in Fixed-Point Arithmetic", *Vienna University of Technology and Universidad Politecnica De Cartagena*, Jun. 2014, pp. 1-85.

Dwivedi, Namrata, "Fixed-Point Digital Predistortion System for Nonlinear High Power Amplifiers", *Department of Electronics and Communication Engineering*, Jun. 2014, pp. 1-46.

Urs Köster, et al., "Flexpoint: An Adaptive Numerical Format for Efficient Training of Deep Neural Networks", *Artificial Intelligence Products Group, Intel Corporation*, Dec. 2017, pp. 1-14.

Dipankar Das, et al., "Mixed Precision Training of Convolutional Neural Networks Using Integer Operations", *Published as a conference paper at ICLR*, 2018, pp. 1-11.

Extended European Search Report dated Mar. 12, 2020 in corresponding European Patent Application No. 19194053.5 (8 pages in English).

Chen et al., "FxpNet: Training a Deep Convolutional Neural Network in Fixed-Point Representation," 2017 International Joint Conference on Neural networks (IJCNN), IEEE, May 14, 2017, pp. 2494-2501, XP033112353.

Arthurs, Aaron, et al., "Overflow Detection and Correction in a Fixed-Point Multiplier", 2007 IEEE Region 5 Technical Conference. IEEE, 2007.

European Patent Office Action dated Nov. 29, 2021, in counterpart European Patent Application No. 19 194 053.5.

Japanese Office Action dated Apr. 5, 2022, in counterpart Japanese Patent Application No. 2019-189522 (3 pages in English and 3 pages in Japanese).

Chinese Office Action issued on Apr. 1, 2024, in counterpart Chinese Patent Application No. 201910822654.5 (12 pages in English, 9 pages in Chinese).

* cited by examiner

METHOD AND APPARATUS FOR QUANTIZING PARAMETERS OF NEURAL NETWORK

CROSS-REFERENCE TO RELATED APPLICATION

This application claims the benefit under 35 USC § 119(a) of Korean Patent Application No. 10-2018-0123927, filed on Oct. 17, 2018, in the Korean Intellectual Property Office, the disclosure of which is incorporated herein in its entirety by reference.

BACKGROUND

1. Field

The following description relates to a method and an apparatus for quantizing parameters of a neural network.

2. Description of the Related Art

A neural network refers to a computational architecture which models a biological brain. Along with recent advances in neural network technology, there has been a lot of research into analyzing input data and extracting valid information by using a neural network apparatus in various kinds of electronic systems.

The neural network apparatus performs a lot of operations on input data. A technique of efficiently processing such neural network operations is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of quantizing parameters of a neural network includes calculating, for each of the parameters, a bit shift value indicating a degree outside a bit range of a fixed-point format for quantizing the parameters; updating the fixed-point format using the calculated bit shift values of the parameters; and quantizing parameters updated in a learning or inference process according to the updated fixed-point format.

Calculating the bit shift value may include detecting, for each of the parameters, a most significant bit having a value '1'; and determining, for each of the parameters, a difference in a number of bits between the detected most significant bit and a most significant bit of an integer part of the fixed-point format as the bit shift value.

Detecting the most significant bit may include, for each of the parameters, searching for bits within a certain range based on the most significant bit of the integer part of the fixed-point format, and detecting the most significant bit having the value '1'.

Updating the fixed-point format may include determining a number of occurrences of overflow and a maximum bit shift value from the calculated bit shift values; and updating the fixed-point format based on the number of occurrences of overflow and the maximum bit shift value.

Updating the fixed-point format may include, in a case in which the number of occurrences of overflow is greater than a certain value, updating the fixed-point format by reducing a fraction length of the fixed-point format by the maximum bit shift value.

The certain value may be based on a number of parameters.

The updated parameters may be parameters updated in a t+1th learning or inference, process, the parameters may be parameters updated in a t-th learning or inference process, the fixed-point format may be a fixed-point format updated based on the parameters updated in the t−1th learning or inference process, and t may be a natural number greater than or equal to 2.

Calculating the bit shift value may include calculating the bit shift value of each of the parameters in a process of quantizing the parameters according to the fixed-point format.

The parameters may be weights or activations on a same layer in the neural network.

A computer-readable recording medium may store a program for causing a computer to execute the method.

In another general aspect, an apparatus for quantizing parameters of a neural network includes a memory storing at least one program; and a processor configured to, by executing the at least one program, calculate, for each of the parameters, a bit shift value indicating a degree outside a bit range of a fixed-point format for quantizing the parameters, update the fixed-point format using the calculated bit shift values of the parameters; and quantize parameters updated in a learning or inference process according to the updated fixed-point format.

The processor may detect, for each of the parameters, a most significant bit having a value '1'; and determine, for each of the parameters, a difference in a number of bits between the detected most significant bit and a most significant bit of an integer part of the fixed-point format as the bit shift value.

The processor may search for bits within a certain range based on the most significant bit of the integer part of the fixed-point format, and detect the most significant bit having the value '1'.

The processor may determine a number of occurrences of overflow and a maximum bit shift value from the calculated bit shift values; and update the fixed-point format using the number of occurrences of overflow and the maximum bit shift value.

The processor may, in a case in which the number of occurrences of overflow is greater than a predetermined value, update the fixed-point format by reducing a fraction length of the fixed-point format by the maximum bit shift value.

The processor may calculate the bit shift value of each of the parameters in a process of quantizing the parameters according to the fixed-point format.

In another general aspect, a method includes calculating, for each of parameters updated in a t-th learning or inference process of a neural network, a bit shift value based on a fixed-point format for quantizing the parameters; determining a number of occurrences of overflow and a maximum bit shift value from the calculated bit shift values; updating the fixed-point format based on the number of occurrences of overflow and the maximum bit shift value; and quantizing the parameters in a t+1th learning or inference process of the neural network based on the updated fixed-point format, and t is a natural number greater than or equal to 2.

Determining the number of occurrences of overflow may include determining whether the bit shift value of each of the parameter is greater than 0 and increasing the number of occurrences of overflow by 1 for each bit shift value that is greater than 0.

Determining the maximum bit shift value may include comparing the calculated bit shift values of the parameters with each other updated in the t-th learning or inference process and determining a maximum value among the bit shift values updated in the t-th learning or inference process as the maximum bit shift value.

In another general aspect, a computer-readable recording medium has recorded thereon one or more programs including instructions for performing the method of quantizing parameters of a neural network.

Other features and aspects will be apparent from the following detailed description, the drawings, and the claims.

Figure 1:
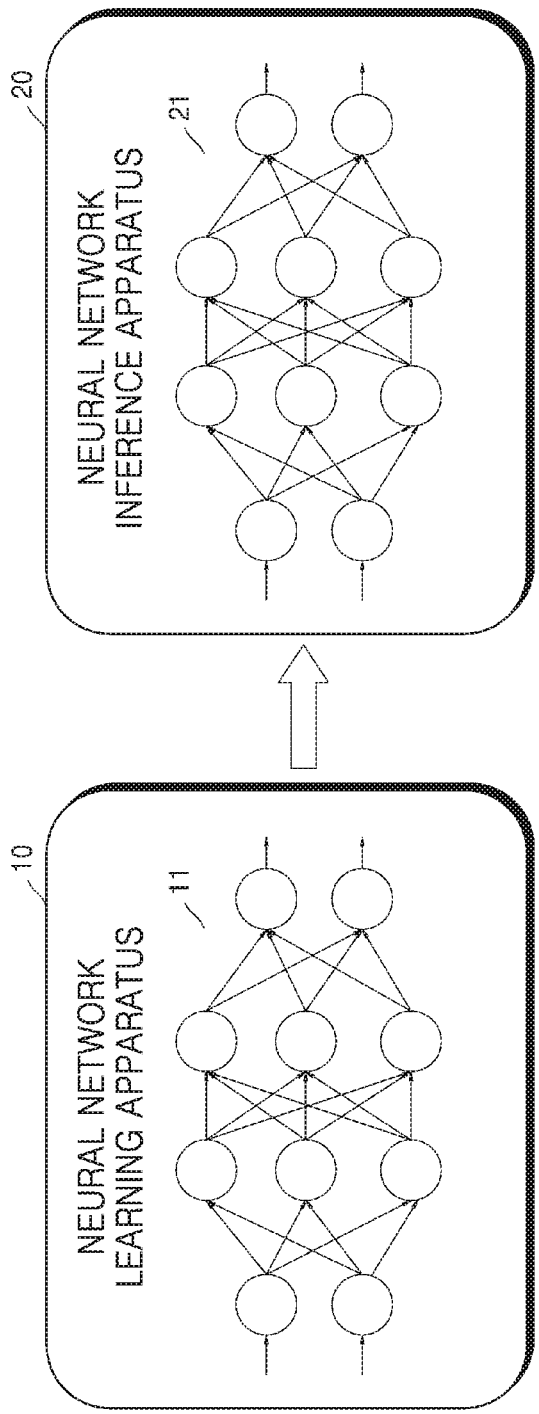
FIG. 1 is a diagram for explaining a neural network learning apparatus and a neural network inference apparatus according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As used herein, the terms 'comprises' or 'comprising' and the like should not be construed as necessarily including all of various elements or operations described in the specification and should be as excluding some of them, or may be interpreted as including additional components or operations.

Also, as used herein, the terms including ordinals such as "first" or "second" may be used to describe various elements, but the elements should not be limited by the terms. The terms are used only for the purpose of distinguishing one element from another.

The examples are directed to a method and an apparatus for processing parameters of a neural network, and detailed descriptions thereof will be omitted with respect to matters widely known to one of ordinary skill in the art.

FIG. 1 is a diagram for explaining a neural network learning apparatus 10 and a neural network inference apparatus 20 according to an example.

Referring to FIG. 1, the neural network learning apparatus 10 may correspond to a computing device having various processing functions, such as functions to generate a neural network, train or learn the neural network, quantize a floating-point format neural network to a fixed-point format neural network, quantize a fixed-point format neural network to another fixed-point format neural network, or retrain the neural network. For example, the neural network learning apparatus 10 may be implemented into various types of devices such as personal computers (PCs), server devices, mobile devices, etc. Meanwhile, parameter quantization may signify a conversion of a floating-point format parameter to a fixed-point format parameter or signify a conversion of a fixed-point format parameter having a certain bit width to another fixed-point format parameter having another bit width.

The neural network learning apparatus 10 may generate a trained neural network 11 by repeatedly training (learning) a given initial neural network. In this state, the initial neural network may have, in terms of securing a processing accuracy of the neural network, floating-point format parameters, for example, parameters of 32-bit floating-point precision. The parameters may include various types of data input/output to/from the neural network, for example, input/output activations, weights, biases, etc. of the neural network. As the training of a neural network is repeated, the floating-point parameters of a neural network may be tuned to output a more accurate output with respect to a given input.

The neural network learning apparatus 10 may process parameters according to the fixed-point format in a process of repeatedly learning (training) the initial neural network. Specifically, the neural network learning apparatus 10 may process the parameters according to an 8-bit or 16-bit fixed-point format, in order to learn the neural network within an allowable accuracy loss while sufficiently reducing the number of operations. Thus, the neural network learning apparatus 10 may be implemented in smart phones, tablets, or wearable devices with relatively low processing capabilities, for on-device learning.

The neural network learning apparatus 10 may transmit the trained neural network 11 to a hardware accelerator, such as the neural network inference apparatus 20. The neural network inference apparatus 20 may be included in mobile devices, embedded devices, etc. The neural network inference apparatus 20 is dedicated hardware for driving a quantized neural network 21. Since the neural network inference apparatus 20 is implemented with relatively low power or low performance, the neural network inference apparatus 20 may be implemented to be more appropriate for a fixed-point operation than a floating-point operation. The neural network inference apparatus 20 may correspond to, but is not limited to, a tensor processing unit (TPU), a neural engine, etc., which are dedicated modules for driving a neural network.

The neural network inference apparatus 20 for driving the quantized neural network 21 may be implemented in a separate device that is independent of the neural network learning apparatus 10. However, the present disclosure is not limited thereto, and the neural network inference apparatus 20 may be implemented in the same device as the neural network learning apparatus 10.

The neural network inference apparatus 20 that deploys the quantized neural network 21 may be included in, for example, autonomous vehicles, robotics, smart phones, tablet devices, augmented reality (AR) devices, Internet of things (IoT) devices, etc., which perform voice recognition, image recognition, etc. by using a neural network, but the present disclosure is not limited thereto.

Figure 2:
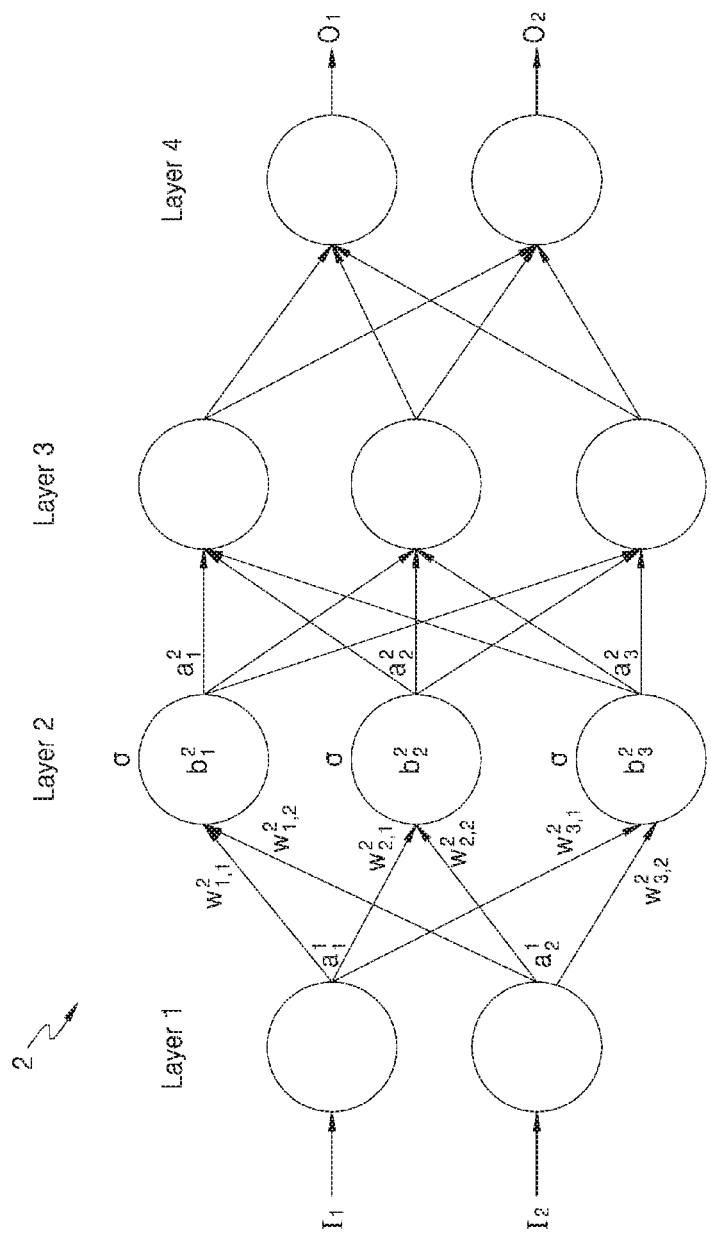
FIG. 2 is a diagram showing an example of a neural network according to an example.

FIG. 2 is a diagram showing an example of a neural network 2.

Referring to FIG. 2, the neural network 2 may have a structure including an input layer, hidden layers, and an output layer, may perform an operation based on received input data, for example, $I_1$ and $I_2$, and may generate output data, for example, $O_1$ and $O_2$, based on a result of the operation.

The neural network 2 may be a deep neural network (DNN) or n-layer neural network including one or more hidden layers. For example, as illustrated in FIG. 2, the neural network 2 may be a DNN including an input layer 1, two hidden layers Layer 2 and Layer 3, and an output layer 4. The DNN may include a Convolutional Neural Network (CNN), a Recurrent Neural Network (RNN), a Deep Belief Network, a Restricted Boltzman Machine, etc. but is not limited thereto.

Although the neural network 2 is illustrated to include four layers, this is merely exemplary and the neural network 2 may include more or less layers, or more or less nodes. Also, the neural network 2 may include layers having various structures different from the structure illustrated in FIG. 2. For example, the neural network 2 may include a convolution layer, a pooling layer, and a fully connected layer as the DNN.

Each of the layers included in the neural network 2 may include a plurality of artificial nodes, which are known as neurons, processing elements (PE), units, or terms similar thereto. For example, as illustrated in FIG. 2, Layer 1 may include two nodes, and Layer 2 may include three nodes. However, this is merely exemplary, and each of the layers included in the neural network 2 may include various numbers of nodes.

The nodes included in the respective layers of the neural network 2 may be connected to each other in order to process data. For example, one node may receive data from other nodes and process the data, and may output an operation result to other nodes.

An output value of each of the nodes may be referred to as an activation. The activation may be an output of one node and an input value of nodes included in the next layer.

Each of the nodes may determine its own activation based on the activations and weights received from the nodes included in the previous layer. The weight is a parameter used to calculate an activation in each node, and may be a value allotted to a connection relation between the nodes.

Each of the nodes may be processed by a computational unit that receives an input and outputs an activation, and may map the input and output when σ denotes an activation function, $W_{jk}^i$ denotes a weight from a k-th node included in an (i−1)th layer to a j-th node included in an i-th layer, $b_j^i$ denotes a bias of the j-th node included in the i-th layer, and $a_j^i$ denotes an activation of the j-th node of the i-th layer, the activation $a_j^i$ may be calculated by using Equation 1 below.

$$a_j^i = \sigma\left(\sum_k (w_{jk}^j \times a_k^{j-1}) + b_j^i\right) \quad \text{Equation 1}$$

As illustrated in FIG. 2, an activation of a first node of the second layer 2 may be expressed as $a_1^2$. Furthermore, $a_1^2$ may have a value of "$a_1^2 = \sigma(w_{1,1}^2 \times a_1^1 + w_{1,2}^2 \times a_2^1 + b_1^2)$" according to Equation 1. However, the above described Equation 1 is merely an example for describing the activation, weight, and bias used to process data in the neural network 2, and the present disclosure is not limited thereto. The activation may be a value obtained by allowing a value obtained by applying an activation function to a weighted sum of the activations received from the previous layer to pass through a rectified linear unit (ReLU).

As described above, in the neural network 2, a large number of data sets are exchanged between a plurality of mutually connected nodes and undergo many computation processes through layers.

Figure 3A:
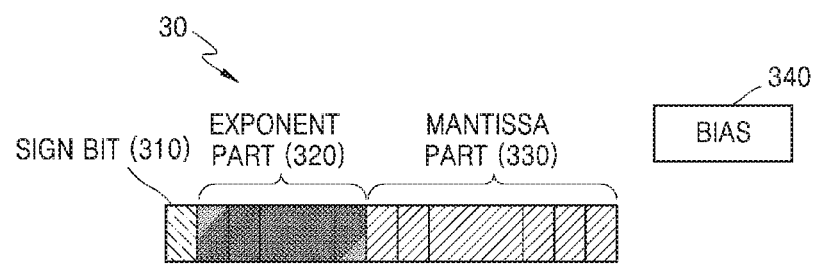
FIG. 3A is a diagram illustrating a floating point format parameter according to an example.
Figure 3B:
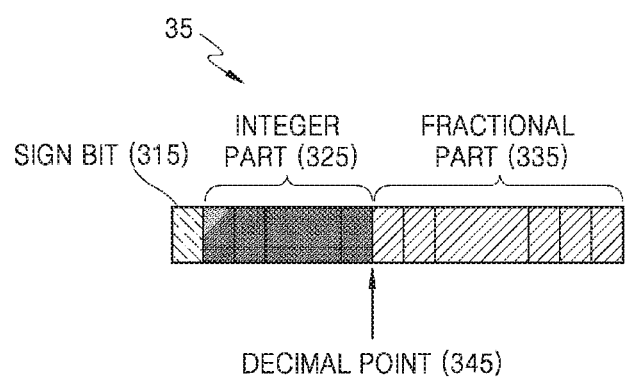
FIG. 3B is a diagram illustrating a fixed point format parameter according to an example.
Figure 3C:
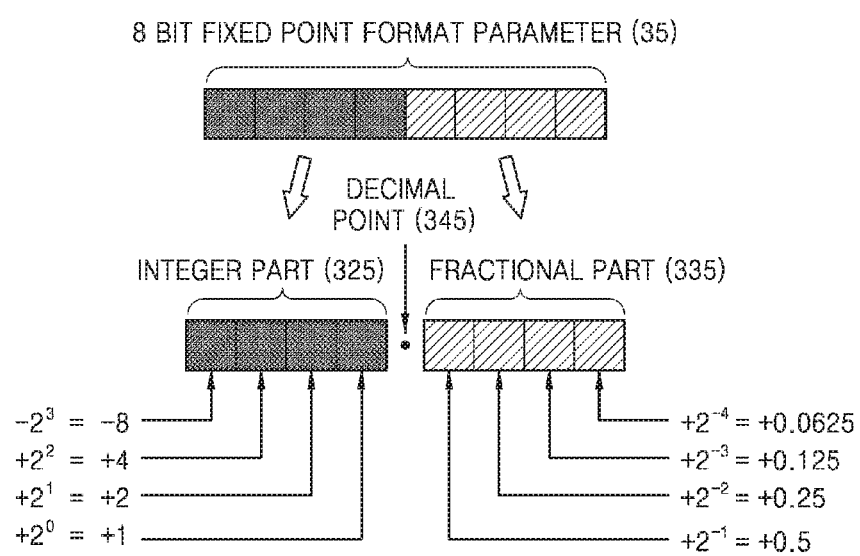
FIG. 3C is a diagram illustrating a fixed point format parameter according to another example.

FIG. 3A is a diagram illustrating a floating point format parameter 30 according to an example. FIG. 3B is a diagram illustrating a fixed point format parameter 35 according to an example. FIG. 3C is a diagram illustrating a fixed point format parameter according to another example.

Referring to FIG. 3A, the floating point format parameter 30 may include a sign bit 310, an exponent part 320, a mantissa part 330, and a bias 340. A floating point indicates that a number is divided into a part indicating a decimal point part (that is, mantissa) and a part indicating a decimal point position.

The mantissa part 330 may correspond to the part indicating the decimal point part. The exponent part 320 may correspond to the part indicating the decimal point position. The sign bit 310 may determine a sign of the floating point format parameter 30. The bias 340 may be a value that is added to or subtracted from the exponent part 320 and that is determined to represent a negative exponent. The floating point format parameter 30 may include the sign bit 310, bits corresponding to the exponent part 320, and bits corresponding to the mantissa part 330. The bias 340 may be previously determined with respect to the floating point format parameter 30 and stored separately.

When the sign bit 310 denotes a sign, the exponent part 320 denotes an exponent, the mantissa part 330 denotes a mantissa, and the bias 340 denotes a bias, the floating point format parameter 30 may be a value according to Equation 2 below.

$$\text{Floating point value} = (-1)^{sign} \cdot 2^{exponent-bias} \cdot \text{mantissa} \quad \text{Equation 2}$$

Referring to FIG. 3B, the fixed point format parameter 35 may include a sign bit 315, an integer part 325, a fractional part 335, and a decimal point 345. A fixed point indicates a notation representing decimal of a fixed digit number using a decimal point.

The sign bit 315 may determine a sign of the fixed point format parameter 35. The integer part 325 may correspond to a part representing an integer of the fixed point format parameter 35. The fractional part 335 may correspond to a part representing the decimal of the fixed point format parameter 35. The decimal point 345 may indicate a point that is a reference for distinguishing the integer part 325 and the fractional part 335 of the fixed point format parameter 35.

A value represented by the fixed point format parameter 35 may be described with reference to FIG. 3C. Referring to FIG. 3C, the fixed point format parameter 35 may be an 8-bit fixed point value. The fixed point format parameter 35 may also include the integer part 325, the fractional part 335, and the decimal point 345.

Each of the bits representing the integer part 325 and the fractional part 335 may have a value of 1 or 0. As shown in FIG. 3C, the bits representing the integer part 325 and the fractional part 335 may sequentially have values of −8, +4, +2, +1, +0.5, +0.25, +0.125 and +0.0625. When a most significant bit of the integer part 325 is 1, since a value represented by the most significant bit of the integer part 325 is −8, even though other bits included in the integer part 325 and the fractional part 335 have a certain value, the value represented by the fixed point format parameter 35 may be negative. The most significant bit of the integer part 325 may correspond to the sign bit 315 that determines the sign of the fixed point format parameter 35.

However, FIG. 3C is only an example, and the fixed point format parameter 35 may be a 16-bit fixed point value and may be a fixed point value having any suitable number of bits. Further, the fixed point format parameter 35 may represent a negative number by any one of a coding expression method, a ones' complement method, and a twos' complement method.

Figure 4:
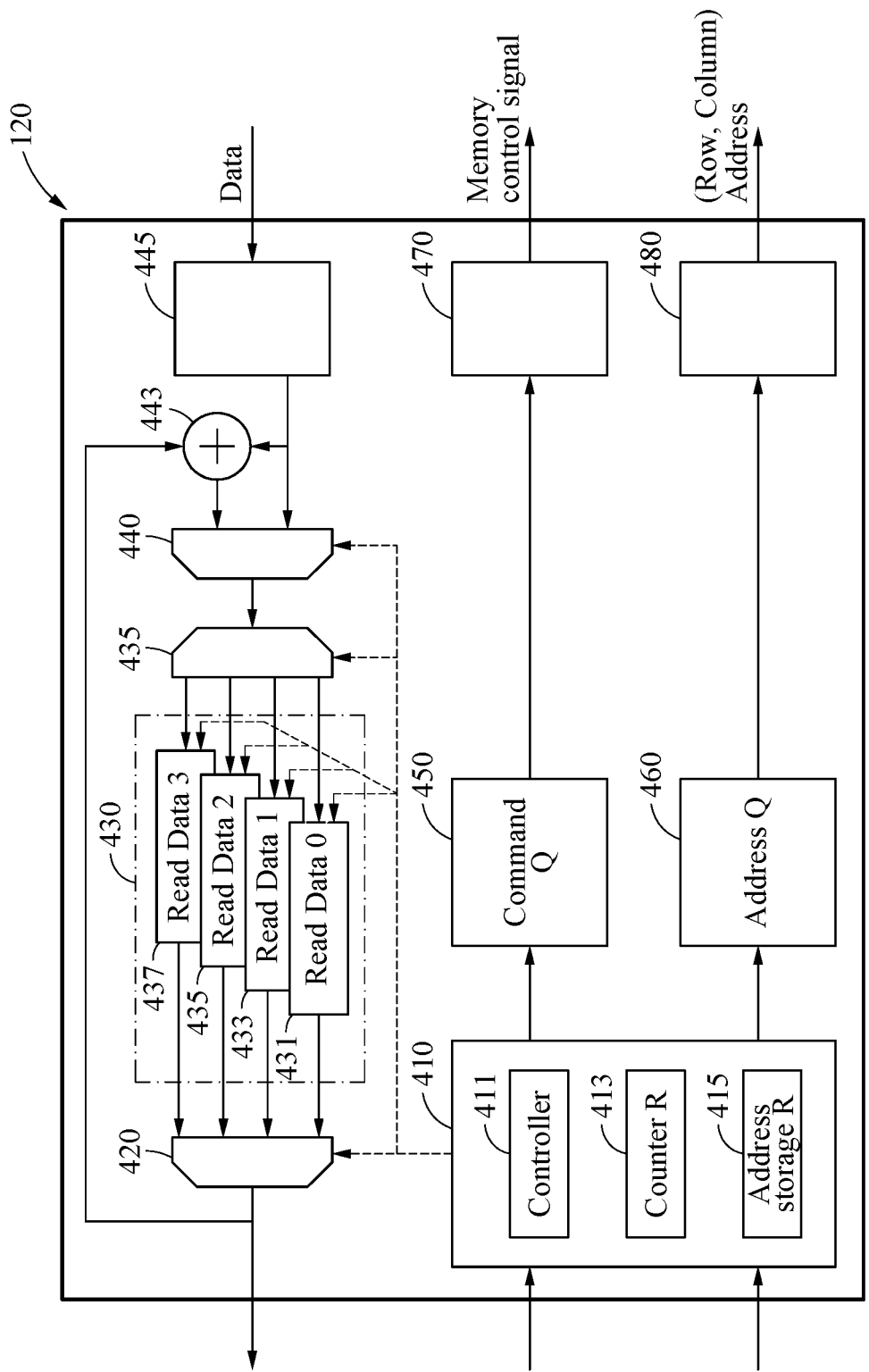
FIG. 4 is a block diagram of a hardware configuration of a neural network apparatus according to an example.

FIG. 4 is a block diagram of a hardware configuration of a neural network apparatus 100 according to an example.

The neural network apparatus 100 may operate by being included in at least one of the neural network learning apparatus 10 and the neural network inference apparatus 20 or may operate as an independent third hardware accelerator.

Referring to FIG. 4, the neural network apparatus 100 may include a processor 110 and a memory 120. In FIG. 4, only constituent elements of the neural network apparatus 100 of the present example are illustrated. Accordingly, it is obvious to a person having ordinary skill in the art that the neural network apparatus 100 may further include general purpose constituent elements other than the constituent elements illustrated in FIG. 4.

The processor 110 performs all functions to control the neural network apparatus 100. For example, the processor 110 controls all functions of the neural network apparatus 100 by executing programs stored in the memory 120 in the neural network apparatus 100. The processor 110 may be implemented by a central processing unit (CPU), a graphics processing unit (GPU), an application processor (AP), etc., which are provided in the neural network apparatus 100. However, the present disclosure is not limited thereto.

The memory 120 is hardware for storing various pieces of data processed in the neural network apparatus 100. For example, the memory 120 may store data processed and to be processed in the neural network apparatus 100. Furthermore, the memory 120 may store applications, drivers, etc. to be driven by the neural network apparatus 100. The memory 120 may be (dynamic random-access memory) DRAM, but the present disclosure is not limited thereto. The memory 120 may include at least one of volatile memory or nonvolatile memory.

The processor 110 may generate a trained neural network by repeatedly learning an initial neural network. The processor 110 may repeatedly update parameters of the neural network by repeatedly learning the neural network. For example, a weight in the neural network may be updated repeatedly during a learning process, and an activation may also be updated repeatedly due to an operation with the weight. The processor 110 may quantize the updated parameters in a fixed-point format each time the parameters of the neural network are repeatedly updated. Also, the processor 110 may repeatedly update the fixed-point format whenever the parameters of the neural network are repeatedly updated. When a variable parameter is quantized in the fixed-point format, since an accuracy loss may occur during the learning process, the processor 110 may update the fixed-point format to quantize the parameters, thereby reducing the accuracy loss while reducing the number of operations. Specifically, the processor 110 may update the fixed-point format to correspond to a distribution of fixed-point values of the updated parameters. For example, the processor 110 may update a decimal point position in the fixed-point format to correspond to a parameter having a maximum value among the updated parameters.

The processor 110 may repeatedly update the parameters of the neural network, even in an inference process of driving the learned neural network to obtain a resultant value. For example, in the inference process, data may be repeatedly input to the learned neural network, and accordingly activations in the learned neural network may be repeatedly updated. Thus, like the learning process, the processor 110 may quantize the updated parameters according to the fixed-point format every time the parameters of the neural network are repeatedly updated, even in the inference process. Also, like the learning process, the processor 110 may repeatedly update the fixed-point format every time the parameters of the neural network are repeatedly updated, even in the inference process.

The processor 110 may update the parameters in a t-th learning or inference process and then may quantize the updated parameters. At this time, the processor 110 may quantize the updated parameters in the t-th learning or inference process according to a certain first fixed-point format. For example, the first fixed-point format may be an updated fixed-point format based on parameters updated in a t−1th learning or inference process. The processor 110 may update the existing first fixed-point format to a second fixed-point format based on the parameters updated in the t-th learning or inference process. Subsequently, the processor 110 may quantize the parameters updated in a t+1th learning or inference process according to the second fixed-point format.

Accordingly, when quantizing the parameters updated in the t-th learning or inference process, the processor 110 may quantize the parameters according to the certain fixed-point format, thereby reducing a time to scan all the parameters updated in the t-th learning or inference process and hardware overhead to determine the fixed-point format.

Figure 5:
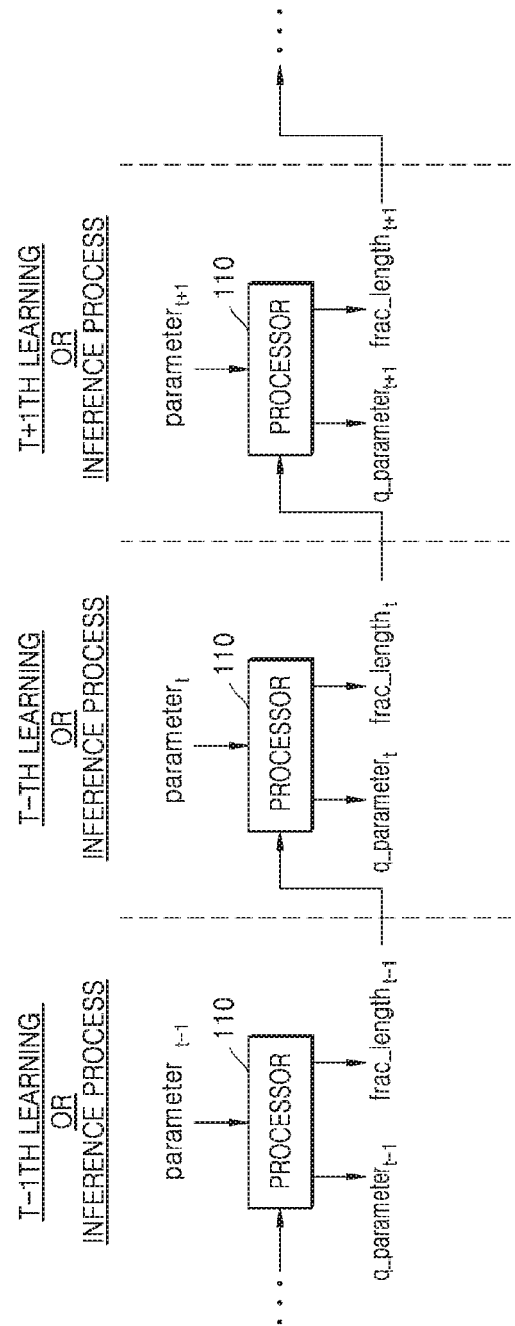
FIG. 5 illustrates an example in which a processor operates in a repeated learning or inference process.

FIG. 5 illustrates an example in which the processor 110 operates in a repeated learning or inference process.

The processor 110 may quantize parameters $parameter_t$ updated in a t-th learning or inference process, according to a fixed-point format having a fraction length $frac\_length_{t-1}$ to generate quantized parameters $q\_parameter_t$. In other words, the processor 110 may previously determine the fixed-point format having the fraction length frac_length$_{t-1}$ based on parameters parameter$_{t-1}$ updated in a t−1th learning or inference process, and quantize the parameters parameter$_t$ according to the fixed-point format having the fraction length frac_length$_{t-1}$ in the t-th learning or inference process.

The processor 110 may update the existing fraction length frac_length$_{t-1}$ to a fraction length frac_length$_t$ based on the parameters parameter$_t$. In other words, the processor 110 may previously determine the fraction length frac_length$_t$ for quantizing parameters parameter$_{t+1}$ updated in a t+1th learning or inference process.

The processor 110 may update the parameters parameter$_t$ to the parameters parameter$_{t+1}$ in the t+1th learning or inference process. Also, the processor 110 may quantize the parameters parameter$_{t+1}$ according to a fixed-point format having the fraction length frac_length$_t$ to generate quantized parameters q_parameter$_{t+1}$.

In FIG. 5, the parameters parameter$_{t-1}$, parameter$_t$, and parameter$_{t+1}$ may be, according to an example, data tensors such as weights or input/output activations on the same layer in a neural network, and according to another example, weights or input/output activations on the same channel in the neural network. Also, t may be a natural number of 1 or more, and when t is 1, a fixed-point format for quantizing parameters updated in a first learning or inference process may be preset by a user.

Referring again to FIG. 4, the processor 110 may calculate, for each of the parameters, a bit shift value indicating a degree outside a bit range of the fixed-point format for quantizing the parameters. The bit shift value may be a value indicating a degree in which a bit range representing a parameter value is outside a bit range that may be covered by the fixed-point format. According to an example, in the case where the fixed-point format may cover up to a 3 bit of an integer part, the bit shift value may be 3 when up to a 6 bit digit of the integer part is necessary to represent the parameter value in the fixed-point format. As another example, in the case where the fixed-point format may cover up to a 4 bit of the fractional part, the bit shift value may be −2 when up to a 6 bit digit of the fractional part is necessary to represent the parameter value in the fixed-point format. The bit shift value also indicates how much an overflow or an underflow occurs in quantizing the parameters in the fixed-point format. For example, when the bit shift value is 3, it may be seen that the overflow occurs by 3 bits, and when the bit shift value is −2, it may be seen that the underflow occurs by 2 bits. Thus, the processor 110 may calculate bit shift values of the parameters to determine the total number of occurrences of overflow or underflow with respect to the parameters. Also, the processor 110 may store the bit shift values, the parameters, the number of occurrences of overflow, and the number of occurrences of underflow in the memory 120.

The processor 110 may update the fixed-point format using the bit shift values of the parameters. According to an example, the processor 110 may update the fixed-point format by reducing a length of the fractional part in the fixed-point format by the maximum bit shift value among the bit shift values when the number of occurrences of overflow is greater than a predetermined value. According to another example, the processor 110 may update the fixed-point format using the maximum bit shift value and the minimum bit shift value among the bit shift values when the number of occurrences of overflow is greater than the predetermined value. Also, the processor 110 may store information about the updated fixed-point format in the memory 120.

The processor 110 may then quantize the parameters updated in the learning or inference process, according to the updated fixed-point format. Specifically, the processor 110 may quantize the parameters updated in the t+1-th learning or inference process according to the updated fixed-point format through the bit shift values of the parameters updated in the t-th learning or inference process.

Accordingly, the processor 110 may update the fixed-point format using the number of occurrences of overflow of parameters and the maximum bit shift value, thereby updating the fixed-point format through relatively simple operations with fewer operations, and thus hardware overhead may be reduced.

Figure 6:
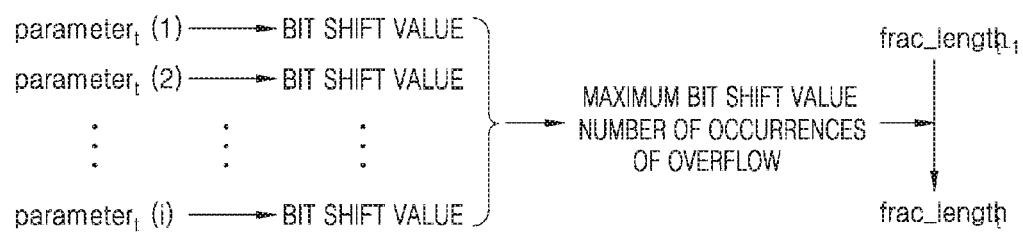
FIG. 6 illustrates an example in which a processor updates a fixed-point format using bit shift values of parameters.

FIG. 6 illustrates an example in which the processor 110 updates a fixed-point format using bit shift values of parameters.

The processor 110 may calculate a bit shift value of each of parameters parameter$_t$(1) through parameter$_t$(i) (where i is a natural number greater than or equal to 2) updated in a t-th learning or inference process. Specifically, the processor 110 may calculate the bit shift value of each of the parameters parameter$_t$(1) through parameter$_t$(i) (where i is a natural number greater than or equal to 2), with respect to a bit range of the fixed-point format having the predetermined fraction length frac_length$_{t-1}$.

Figure 7:
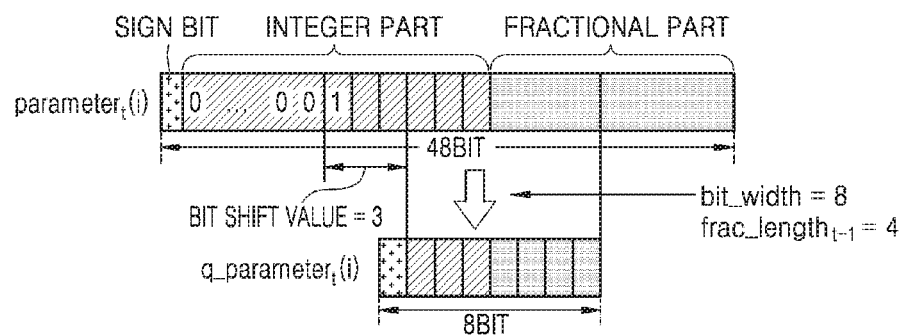
FIG. 7 illustrates an example in which a processor calculates a bit shift value of a parameter.

FIG. 7 illustrates an example in which the processor 110 calculates a bit shift value of the i-th parameter parameter$_t$(i).

The processor 110 may calculate a bit shift value of the i-th parameter parameter$_t$(i) among parameters updated in a t-th learning or inference process.

The processor 110 may detect the most significant bit having a value of '1' in the i-th parameter parameter$_t$(i). Referring to FIG. 7, the processor 110 may detect a sixth bit of an integer part in the i-th parameter parameter$_t$(i) as the most significant bit.

Subsequently, the processor 110 may determine, as the bit shift value of the i-th parameter parameter$_t$(i), a difference in the number of bits between the most significant bit of the integer part in a fixed-point format having the fraction length frac_length$_{t-1}$ for quantizing the i-th parameter parameter$_t$(i) and the most significant bit of the previously detected i-th parameter parameter$_t$(i). Referring to FIG. 7, since a third bit of the integer part in the fixed-point format having the fraction length frac_length$_{t-1}$ is the most significant bit, the difference in the number of bits between the sixth bit and the third bit is 3, and thus the processor 110 may calculate the bit shift value of the i-th parameter parameter$_t$(i) as 3. A bit shift detector for detecting the difference in the number of bits may be included in the processor 110. Also, the processor 110 may determine that an overflow occurs one time by 3 bits with respect to the i-th parameter parameter$_t$(i).

The processor 110 may quantize the i-th parameter parameter$_t$(i) according to the fixed-point format having the fraction length frac_length$_{t-1}$ to generate the quantized parameter q_parameter$_t$(i), thereby calculating the bit shift value of the i-th parameter parameter$_t$(i) in a process of quantizing the i-th parameter parameter$_t$(i). In other words, the processor 110 may proceed with a process of calculating the bit shift value of the i-th parameter parameter$_t$(i) together with the process of quantizing the i-th parameter parameter$_t$(i).

In FIG. 7, the i-th parameter parameter$_t$(i) updated in the t-th learning or inference process is shown as a 48 bit fixed-point value and the quantized parameter q_parameter$_t$(i) is shown as a fixed point value of 4 having a bit width of 8 and a fraction length of 4, but is not limited thereto.

Figure 8:
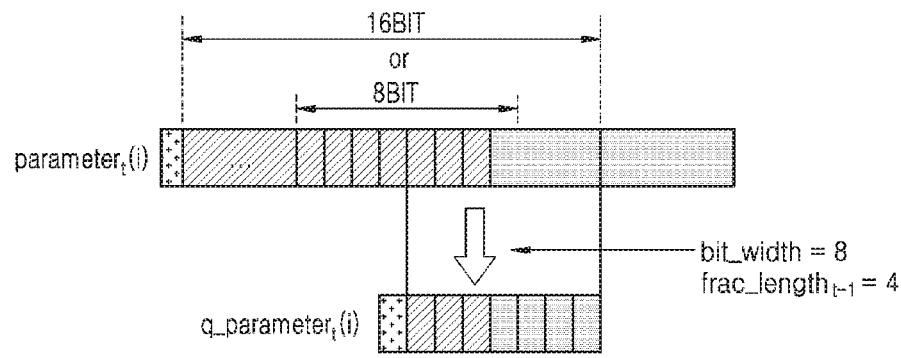
FIG. 8 illustrates an example in which a processor detects the most significant bit having '1' in a parameter.

FIG. 8 illustrates an example in which the processor 110 detects the most significant bit having '1' in the parameter parameter$_t$(i).

The processor 110 may read bit values sequentially in a lower bit direction starting from the most significant bit in the parameter parameter$_t$(i) to detect the most significant bit having '1' in the parameter parameter$_t$(i).

According to another example, the processor 110 may read bits within a predetermined range with respect to a predetermined bit in the parameter parameter$_t$(i) to detect the most significant bit having '1' in the parameter parameter$_t$(i). For example, as shown in FIG. 8, the processor 110 may read bits in a 8-bit or 16-bit range with respect to the most significant bit of an integer part in a fixed-point format having the fraction length frac_length$_{t-1}$ to detect the most significant bit having '1' in the parameter parameter$_t$(i). Therefore, the processor 110 may read the bits within the predetermined range without reading all the bits in the parameter parameter$_t$(i), thereby reducing hardware overhead for scanning.

Referring again to FIG. 6, the processor 110 may determine the maximum bit shift value and the number of occurrences of overflow, from bit shift values of the parameters parameter$_t$(1) through parameter$_t$(i). Specifically, the processor 110 may determine the maximum value of the bit shift values as the maximum bit shift value, and determine the number of bit shift values corresponding to positive numbers among the bit shift values as the occurrence frequency of overflow.

The processor 110 may then update the fixed-point format based on the maximum bit shift value and the number of occurrences of overflow. In other words, the processor 110 may update the fixed-point format with the fraction length frac_length$_{t-1}$ to a fixed-point format with the fraction length frac_length$_t$, based on the maximum bit shift value and the number of occurrences of overflow. Specifically, when the number of occurrences of overflow is greater than a certain value, the processor 110 may reduce the fraction length frac_length$_{t-1}$ by the maximum bit shift value, and update the fraction length from the existing fraction length frac_length$_{t-1}$ to the new fraction length frac_length$_t$.

Accordingly, the processor 110 may quantize parameters updated in the t+1th learning or inference process according to the fixed-point format with the fraction length frac_length$_t$.

Figure 9:
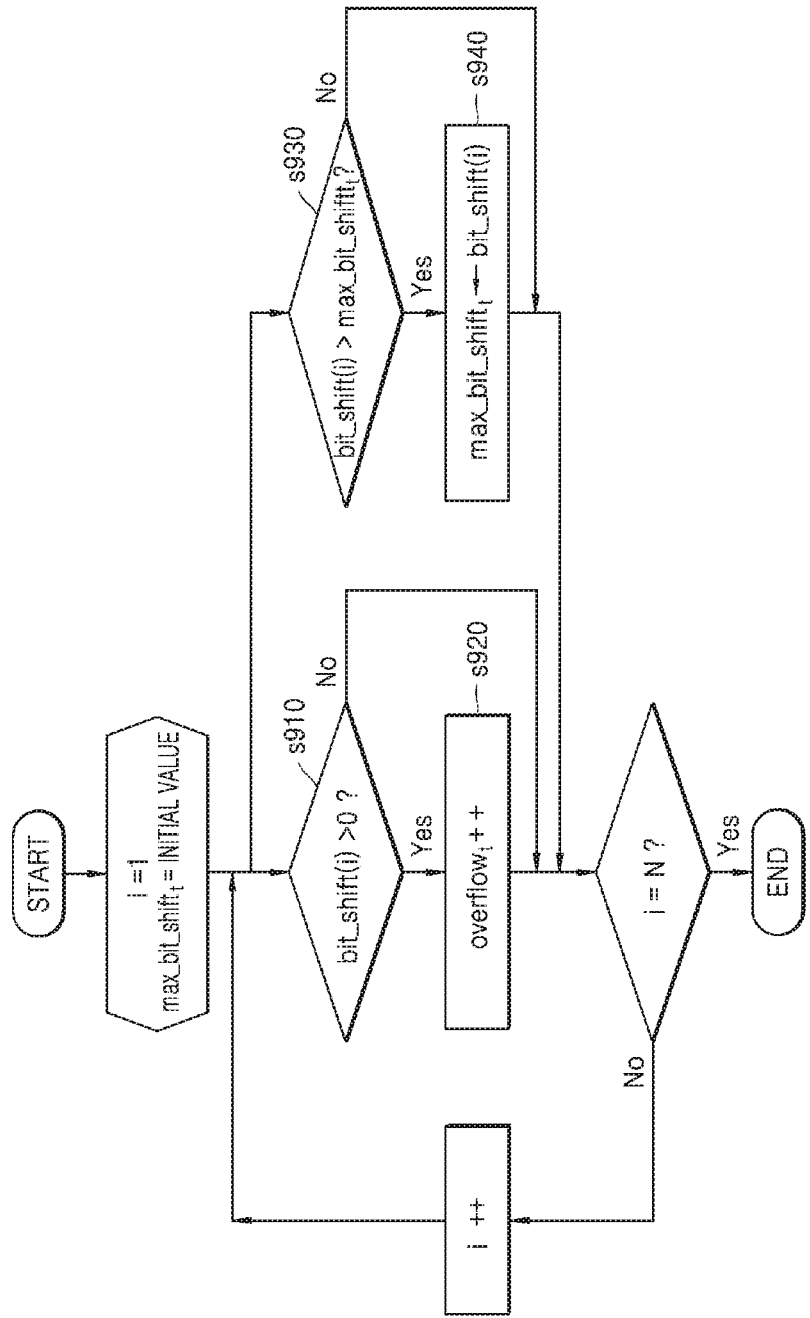
FIG. 9 illustrates an example in which a processor determines the maximum bit shift value and the number of occurrences of overflow.

FIG. 9 illustrates an example in which the processor 110 determines the maximum bit shift value and the number of occurrences of overflow.

Like a logical operation shown in FIG. 9, the processor 110 may determine the maximum bit shift value and the number of occurrences of overflow through the logical operation on a total of N parameters, which are parameters updated in the t-th learning or inference process. The processor 110 may include a logical operator for performing the logical operation shown in FIG. 9.

In operation s910, the processor 110 may determine whether a bit shift value bit_shift(i) of the i-th parameter among the parameters is greater than 0. In other words, the processor 110 may determine whether the i-th parameter is a parameter corresponding to an overflow. When the bit shift value bit_shift(i) of the i-th parameter is greater than 0, the processor 110 may increase the number of occurrences of overflow by 1 (s920). Thereafter, the processor 110 may determine whether a bit shift value bit_shift(i+1) of the i+1th parameter is greater than 0 to determine the number of occurrences of overflow. As a result, the processor 110 may sequentially determine whether each of the bit shift values of the N parameters updated in the t-th learning or inference process is greater than 0, and determine the total number of occurrences of overflow in the t-th learning or inference process.

In operation s930, the processor 110 may compare the bit shift value bit_shift(i) of the i-th parameter with the existing maximum bit shift value max_bit_shift$_t$. The processor 110 may update the bit shift value bit_shift(i) to the maximum bit shift value max_bit_shift$_t$ when the bit shift value bit_shift(i) is greater than the existing maximum bit shift value max_bit_shift$_t$ (s940). The processor 110 may then determine whether to update the maximum bit shift value max_bit_shift$_t$ by comparing the bit shift value bit_shift(i+1) of the i+1th parameter with the updated maximum bit shift value max_bit_shift$_1$. As a result, the processor 110 may compare the bit shift values of the N parameters with each other updated in the t-th learning or inference process, thereby determining the maximum value among the bit shift values as the maximum bit shift value max_bit_shift$_t$.

The processor 110 may determine, among the bit shift values of the N parameters, the minimum bit shift value corresponding to an underflow. Specifically, the processor 110 may compare the bit shift values of the N parameters with each other to determine the minimum bit shift value that is the minimum value among the bit shift values having a value less than or equal to 0.

Figure 10:
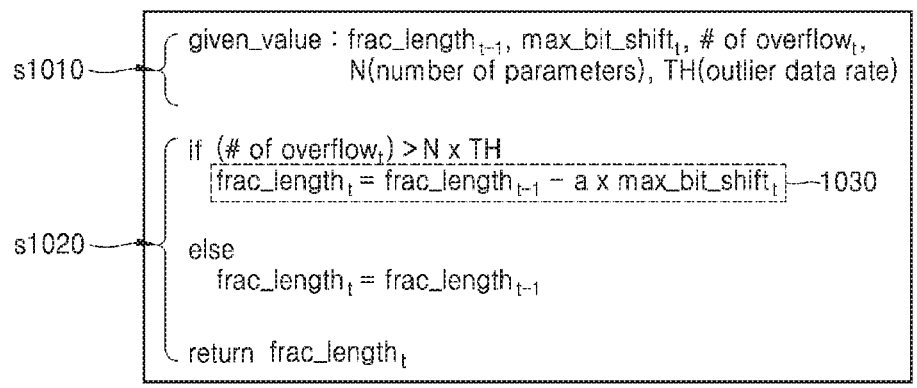
FIG. 10 is a diagram illustrating an algorithm for a processor to update a fraction length of a fixed-point format according to an example.

FIG. 10 is a diagram illustrating an algorithm for the processor 110 to update the fraction length frac_length$_{t-1}$ of a fixed-point format according to an example.

In operation s1010, the processor 110 may obtain the maximum bit shift value max_bit_shift$_t$, the total number of occurrences of overflow # of overflow$_t$, the fraction length frac_length$_{t-1}$ of the fixed-point format for quantizing parameters updated in the t-th learning or inference process, the total number N of the parameters updated in the t-th learning or inference process, and an outlier data rate TH. The processor 110 may determine the maximum bit shift value max_bit_shift$_t$, the total number of occurrences of overflow # of overflow$_t$ through a logic operation shown in FIG. 9. Also, the outlier data rate TH may be set by a user as any number between 0 and 1.

In operation s1020, the processor 110 may update the fraction length frac_length$_{t-1}$ through Equation 1030 when the total number of occurrences of overflow # of overflow$_t$ is greater than N×TH. In Equation 1030, a represents a certain weight. For example, when a is 1, the processor 110 may perform an operation of subtracting the maximum bit shift value max_bit_shift$_t$ from the fraction length frac_length$_{t-1}$ to update the fraction length frac_length$_{t-1}$. In other words, the processor 110 may perform the operation of subtracting the maximum bit shift value max_bit_shift$_t$ from the fraction length frac_length$_{t-1}$ to update the fraction length from the existing fraction length frac_length$_{t-1}$ to the new fraction length frac_length$_t$. Accordingly, the processor 110 may determine the fraction length frac_length$_t$ of the fixed-point format for quantizing parameters updated in the t+1th learning or inference process.

The processor 110 may not update and maintain the fraction length frac_length$_{t-1}$ when the total number of overflows # of overflow$_t$ is not greater than N×TH. In other words, the processor 110 may determine the fraction length frac_length$_{t-1}$ for quantizing the parameters updated in the t-th learning or inference process as the fraction length frac_length$_t$ for quantizing the parameters updated in the t+1th learning or inference process. As a result, the processor 110 may set the outlier data rate TH as the value between 0 and 1 at the total number of overflows # of overflow$_t$ and N×TH that is a comparison target, and thus when it is determined that the total number of overflows # of overflow$_t$ is relatively small compared to the total number N of parameters, may not newly update the fraction length frac_length$_{t-1}$.

Figure 11:
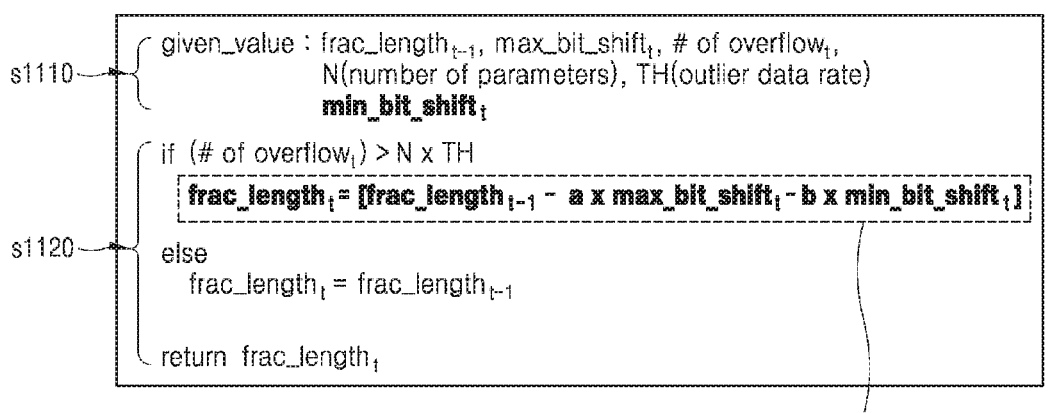
FIG. 11 is a diagram illustrating an algorithm for a processor to update a fraction length of a fixed-point format according to another example.

FIG. 11 is a diagram illustrating an algorithm for the processor 110 to update the fraction length frac_length$_{t-1}$ of a fixed-point format according to another example.

Operations s1110 and s1120 of FIG. 11 may correspond to operations s1010 and s1020 of FIG. 10, and thus redundant descriptions thereof will be omitted.

In operation s1110, the processor 110 may additionally obtain a minimum bit shift value min_bit_shift$_t$, in addition to the information obtained in operation s1010 of FIG. 10. In other words, the processor 110 may obtain the minimum bit shift value min_bit_shift$_t$ corresponding to an underflow among bit shift values of parameters updated in the t-th learning or inference process.

In operation s1120, the processor 110 may update the fraction length frac_length$_{t-1}$ through Equation 1130 when the total number of overflows # of overflow$_t$ is greater than N×TH. In Equation 1130, a and b are values representing certain weights, and symbol [x] represents a Gauss function symbol representing the maximum integer not exceeding x. For example, a user may set a greater weight to a than b to determine the fraction length frac_length$_t$.

Figure 12:
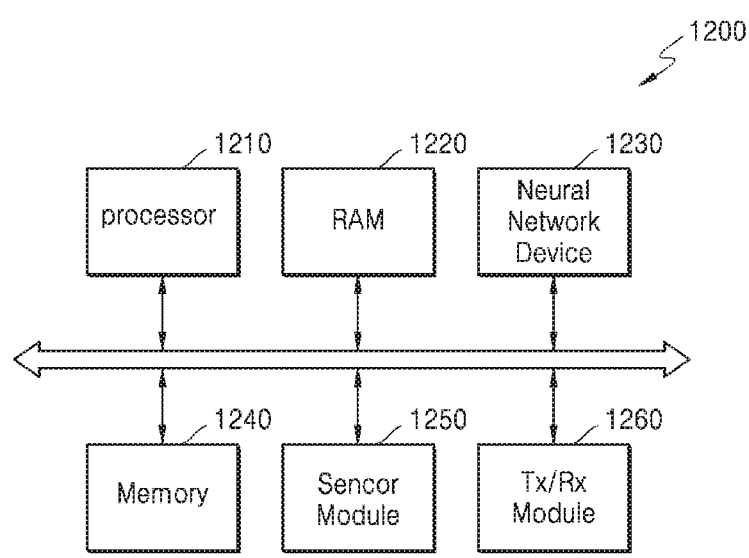
FIG. 12 is a block diagram of an electronic system according to an example.

FIG. 12 is a block diagram of an electronic system 1200 according to an example.

Referring to FIG. 12, the electronic system 1200 may extract effective information by analyzing input data in real time based on a neural network, determine a situation based on the extracted information, or control elements of an electronic device on which the electronic system 1200 is mounted. For example, the electronic system 1200 may be applied to robot devices such as drones, an advanced driver assistance system (ADAS), etc., smart TVs, smart phones, medical devices, mobile devices, image display devices, measuring devices, IoT devices, etc., and may also be mounted on at least one of various types of electronic devices.

The electronic system 1200 may include a processor 1210, RAM 1220, a neural network device 1230, a memory 1240, a sensor module 1250, and a communication (TX/RX) module 1260. The electronic system 1200 may further include an input/output module, a security module, a power control device, etc. Some hardware components of the electronic system 1200 may be mounted on at least one semiconductor chip. The neural network device 1230 may include the above-described neural network apparatus 100 or neural network dedicated hardware accelerator or an apparatus including the same.

The processor 1210 controls all operations of the electronic system 1200. The processor 1210 may include one processor core (Single Core), or a plurality of processor cores (Multi-Core). The processor 1210 may process or execute programs and/or data stored in the memory 1240. The processor 1210 may control functions of the neural network device 1230 by executing the programs stored in the memory 1240. The processor 1210 may be implemented by a CPU, a GPU, an AP, etc.

The RAM 1220 may temporarily store programs, data, or instructions. For example, the programs and/or data stored in the memory 1240 may be temporarily stored in the RAM 1220 according to a booting code or the control of the processor 1210. The RAM 1220 may be implemented by memory such as dynamic RAM (DRAM) or static RAM (SRAM), etc.

The neural network device 1230 may perform an operation of a neural network based on the received input data, and generate an information signal based on a result of the operation. The neural network may include CNNs, RNNs, deep belief networks, restricted Boltzman machines, etc., but the present disclosure is not limited thereto. The neural network device 1230 is hardware that drives the above-described neural network for classification and may correspond to the neural network dedicated hardware accelerator.

The information signal may include one of various types of recognition signals such as voice recognition signal, object recognition signal, image recognition signal, biometric information recognition signal, etc. For example, the neural network device 1230 may receive frame data included in a video stream as input data, and generate from frame data a recognition signal for an object included in an image indicated by the frame data. However, the present disclosure is not limited thereto, and the neural network device 1230 may receive various types of input data and generate a recognition signal according to the input data, according to the type or function of an electronic device on which the electronic system 1200 is mounted.

The memory 1240 is a storage for storing data, such as, an operating system (OS), various programs, and various pieces of data. In an embodiment, the memory 1240 may store intermediate results generated in an operation performing process of the neural network device 1230, such as, an output feature map, as an output feature list or an outer feature matrix. In an embodiment, the memory 1240 may store a compressed output feature map. Furthermore, the memory 1240 may store quantized neural network data, such as, parameters, weight maps, or a weight list, which are used by the neural network device 1230.

The memory 1240 may be DRAM, but the present disclosure is not limited thereto. The memory 1240 may include at least one of a volatile memory and a nonvolatile memory. The nonvolatile memory may include ROM, PROM, EPROM, EEPROM, flash memory, PRAM, MRAM, RRAM, FRAM, etc. The volatile memory may include DRAM, SRAM, SDRAM, PRAM, MRAM, RRAM, FeRAM, etc. In an embodiment, the memory 1240 may include at least one of HDD, SSD, CF, SD, Micro-SD, Mini-SD, xD, and Memory Stick.

The sensor module 1250 may collect information about the periphery of the electronic device on which the electronic system 1200 is mounted. The sensor module 1250 may sense or receive a signal, such as, an image signal, a voice signal, a magnetic signal, a biometric signal, a touch signal, etc., from the outside of the electronic device, and convert a sensed or received signal to data. To this end, the sensor module 1250 may include at least one of various types of sensing devices, such as microphones, imaging devices, image sensors, light detection and ranging (LIDAR) sensors, ultrasonic sensors, infrared sensors, biosensors, touch sensors, etc.

The sensor module 1250 may provide the neural network device 1230 with the converted data as input data. For example, the sensor module 1250 may include an image sensor, and may generate a video stream by photographing the external environment of the electronic device, and provide the neural network device 1230 with consecutive data frames of the video stream in order as input data. However, the present disclosure is not limited thereto, and the sensor module 1250 may provide various types of data to the neural network device 1230.

The communication module 1260 may include various wired or wireless interfaces capable of communicating with external devices. For example the communication module 1260 may include a local area network (LAN), wireless local area network (WLAN) such as wireless fidelity (Wi-Fi), wireless personal area network (WPAN) such as Bluetooth, wireless universal serial bus (USB), ZigBee, near field communication (NFC), radio-frequency identification (RFID), power line communication (PLC), or a communication interface capable of connecting to a mobile cellular network such as 3rd generation (3G), 4th generation (4G), long-term evolution (LTE), etc.

Figure 13:
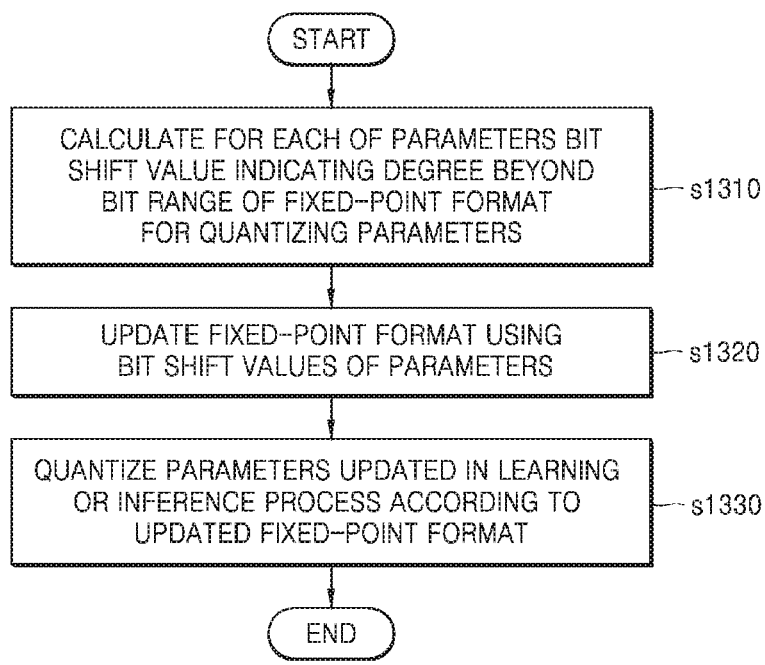
FIG. 13 is a diagram for explaining a method of operating a neural network apparatus according to an example.

FIG. 13 is a diagram for explaining a method of operating the neural network apparatus 100 according to an embodiment.

The method shown in FIG. 13 may be performed by the neural network apparatus 100 of FIG. 4 or each element of the electronic system 1200 of FIG. 12, and redundant explanations are omitted.

In operation s1310, the neural network apparatus 100 may calculate, for each of parameters, a bit shift value indicating a degree outside a bit range of a fixed-point format for quantizing the parameters. Specifically, the neural network apparatus 100 may calculate the bit shift value of each of the parameters updated in the t-th learning or inference process, with respect to a bit range of a predetermined fixed-point format based on parameters updated in the t−1th learning or inference process. The neural network apparatus 100 may calculate the bit shift values of the parameters to determine the total number of occurrences of overflow or underflow for the parameters.

For each of the parameters, the neural network apparatus 100 may detect the most significant bit having a value '1', and for each of the parameters, calculate a difference in the number of bits between the detected most significant bit and the most significant bit of an integer part of the fixed-point format as the bit shift value. Further, for each of the parameters, the neural network apparatus 100 may search for bits in a predetermined range based on the most significant bit of the integer part of the fixed-point format, and detect the most significant bit having the value '1'.

In operation s1320, the neural network apparatus 100 may update the fixed-point format using the bit shift values of the parameters. The neural network apparatus 100 may update the existing fixed-point format for quantizing the parameters in the t-th learning or inference process to a new fixed-point format. For example, when the number of occurrences of overflow is greater than a predetermined value, the neural network apparatus 100 may update the fixed-point format by reducing a fraction length in the fixed-point format by the maximum bit shift value of the bit shift values.

In operation s1330, the neural network apparatus 100 may quantize the parameters updated in a learning or inference process, according to the updated fixed-point format. Specifically, the neural network apparatus 100 may quantize the parameters updated in the t+1-th learning or inference process according to the fixed-point format updated through the bit shift values of the parameters updated in the t-th learning or inference process.

According to the embodiments, a neural network apparatus may update a fixed-point format for quantizing parameters updated in a learning or inference process in accordance with a change of the updated parameters, thereby reducing the amount of computation and reducing the accuracy loss. Also, when quantizing parameters updated in the t-th learning or inference process, the neural network apparatus may quantize the parameters according to a predetermined fixed-point format, thereby reducing a time to scan all the parameters updated in the t-th learning or inference process and hardware overhead to determine the fixed-point format. Also, since the neural network apparatus updates the fixed-point format using the number of occurrences of overflow and the maximum bit shift value of the parameters, the neural network apparatus may update the fixed-point format through relatively simple and small computation, thereby reducing hardware overhead.

The apparatus described herein may include a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media may be read by the computer, stored in the memory, and executed by the processor.

The embodiments may be described in terms of functional block components and various processing steps. Such functional blocks may be realized by any number of hardware and/or software components configured to perform the specified functions. In an embodiment, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure may employ any number of techniques according to the related art for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the disclosure and are not intended to otherwise limit the scope of the disclosure in any way. For the sake of brevity, electronics, control systems, software development and other functional aspects of the systems (and components of the individual operating components of the systems) according to the related art may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   implementing, by a processor, training operations of an in-training neural network or inference operations of a trained neural network, including:
   determining, for each of first parameters, a bit shift value indicating a degree outside a bit range of a fixed-point format, the fixed-point format is for quantizing the each of the first parameters in the fixed-point format;
   updating the fixed-point format by shifting a decimal point position of the fixed-point format based on the determined bit shift values of each of the first parameters as an input to the trained neural network forward propagates in the trained neural network when the inference operations are implemented, as a training input to the in-training neural network forward propagates in the in-training neural network when a forward pass of the training operations are implemented, or as weightings of the in-training neural network are updated in the training operations;
   quantizing, according to the updated fixed-point format, second parameters that have been updated in one of the training operations or one of the inference operations, and
   generating a trained neural network or an inference result based on the quantized second parameters.

2. The method of claim 1, wherein the determining of the bit shift value for each of the first parameters comprises:
   detecting, for each of the first parameters, a most significant bit having a value '1'; and
   determining, for each of the first parameters, a difference in a number of bits between the detected most significant bit and a most significant bit of an integer part of the fixed-point format, respectively as the determined bit shift values.

3. The method of claim 2, wherein the detecting of the most significant bit comprises:
   for each of the first parameters, searching for bits within a certain range based on the most significant bit of the integer part of the fixed-point format, and detecting the most significant bit having the value '1'.

4. The method of claim 1, wherein the updating of the fixed-point format comprises:
   determining, from the determined bit shift values, a number of occurrences of overflow when quantizing each of the first parameters in the fixed-point format and a maximum bit shift value; and
   updating, based on the number of occurrences of overflow and the maximum bit shift value, the fixed-point format.

5. The method of claim 4, wherein the updating of the fixed-point format comprises:
   in a case in which the number of occurrences of overflow is greater than a certain value, changing the fixed-point format by reducing a fraction length of the fixed-point format by the maximum bit shift value.

6. The method of claim 5, wherein the certain value is based on a number of the first parameters.

7. The method of claim 1,
   wherein the second parameters are parameters updated in a t+1th training operation or inference operation,
   wherein the first parameters are parameters updated in a t-th training operation or inference operation,
   wherein the fixed-point format is a fixed-point format that has been updated based on parameters updated in the t-1th training operation or inference operation, and
   wherein t is a natural number greater than or equal to 2.

8. The method of claim 1, wherein the determining of the bit shift value for each of the first parameters comprises:
   determining the bit shift value for each of the first parameters during the quantizing of the first parameters according to the fixed-point format.

9. The method of claim 1, wherein the first parameters and the second parameters are weights or activations, in a same layer in the in-training neural network, of different training iterations of the implemented training operations.

10. A non-transitory computer-readable recording medium storing processor-readable instructions to cause a processor to execute the method of claim 1.

11. The method of claim 1, wherein the updating of the fixed- point format includes selectively changing the fixed-point format depending on the determined bit shift values.

12. An apparatus, the apparatus comprising:
a processor; and
a memory storing processor-readable instructions, where the processor is configured to execute the processor-readable instructions to configure the processor to:
implement training operations of an in-training neural network or inference operations of a trained neural network, including:
a determination, for each of first parameters, a bit shift value indicating a degree outside a bit range of a fixed-point format, the fixed-point format is for quantizing each of the first parameters in the fixed-point format;
an update of the fixed-point format by shifting a decimal point position of the fixed-point format based on the determined bit shift values of each of the first parameters as an input to the trained neural network forward propagates in the trained neural network when the inference operations are implemented, as a training input to the in-training neural network forward propagates in the in-training neural network when a forward pass of the training operations are implemented, or as weightings of the in-training neural network are updated in the training operations;
quantization, according to the updated fixed-point format, second parameters that have been updated in one of the training operations or one of the inference operations; and
generate a trained neural network or an inference result based on the quantized second parameters.

13. The apparatus of claim 12, wherein the processor is configured to:
detect, for each of the first parameters, a most significant bit having a value '1'; and
determine, for each of the first parameters, a difference in a number of bits between the detected most significant bit and a most significant bit of an integer part of the fixed-point format, respectively as the determined bit shift values.

14. The apparatus of claim 13, wherein the processor is configured to search for bits within a certain range based on the most significant bit of the integer part of the fixed-point format, and detect the most significant bit having the value '1'.

15. The apparatus of claim 12, wherein the processor is configured to determine a number of occurrences of overflow when quantizing each of the first parameters in the fixed-point format and a maximum bit shift value from the determined bit shift values, and
wherein, for the updating of the fixed-point format, the processor is configured to update the fixed-point format based on the number of occurrences of overflow and the maximum bit shift value.

16. The apparatus of claim 15, wherein, for the updating of the first fixed-point format, the processor is configured to, in a case in which the number of occurrences of overflow is greater than a predetermined value, change the first fixed-point format by reducing a fraction length of the first fixed-point format by the maximum bit shift value.

17. The apparatus of claim 16, wherein the predetermined value is based on a number of the first parameters.

18. The apparatus of claim 12,
wherein the second parameters are parameters updated in a t+1th training operation or inference operation,
wherein the parameters are parameters updated in a t-th training operation or inference operation,
wherein the fixed-point format is a fixed-point format that has been updated based on parameters updated in the t-1th training operation or inference operation, and
wherein t is a natural number greater than or equal to 2.

19. The apparatus of claim 12, wherein, for the determining of the bit shift value for each of the first parameters, the processor is configured to determine the bit shift value for each of the first parameters during the quantizing of the first parameters according to the fixed-point format.

20. The apparatus of claim 12, wherein the first parameters and the second parameters are weights or activations in a same layer in the in-training neural network or in a trained neural network.

21. A processor-implemented method comprising:
implementing, by a processor, training operations of an in-training neural network or inference operations of a trained neural network, including:
determining, based on a fixed-point format for quantizing parameters in the fixed-point format, for each of parameters that has been updated in a t-th learning or inference process of a neural network, a bit shift value for updating the fixed-point format;
determining, from the determined bit shift values, a number of occurrences of overflow when quantizing the parameters in the fixed-point format and a maximum bit shift value;
updating, the fixed-point format based on the number of occurrences of overflow and the maximum bit shift value, the fixed point format of each of the parameters as an input to the trained neural network forward propagates in the trained neural network when the inference operations are implemented, as a training input to the in-training neural network forward propagates in the in-training neural network when a forward pass of the training operations are implemented, or as weightings of the in-training neural network are updated in the training operations;
quantizing, according to the updated fixed-point format, parameters in a t+1th learning or inference process of the neural network; and
generating a trained neural network or an inference result based on the quantized second parameters,
wherein t is a natural number greater than or equal to 2.

22. The method of claim 21, wherein the determining of the number of occurrences of overflow includes:
determining whether the bit shift value for each of the parameters in the t-th iteration of the training is greater than 0; and
increasing the number of occurrences of overflow by 1 for each bit shift value that is greater than 0.

23. The method of claim 21, wherein the determining of the maximum bit shift value includes comparing the determined bit shift values with each other and determining a maximum value among the determined bit shift values, as the maximum bit shift value.

24. The method of claim 21, wherein determining of the bit shift values comprises:
detecting, for each of the parameters in the t-th learning or inference process, a most significant bit having a value '1'; and
determining, for each of the parameters in the t-th learning or inference process, a difference in a number of bits between the detected most significant bit and a most significant bit of an integer part of the fixed-point format as the bit shift value.

25. The method of claim 24, wherein detecting the most significant bit comprises:
    for each of the parameters in the t-th learning or inference process, searching for bits within a certain range based on the most significant bit of the integer part of the fixed-point format, and detecting the most significant bit having the value '1'.

26. The method of claim 21, wherein updating the fixed-point format comprises:
    in a case in which the number of occurrences of overflow is greater than a certain value, updating the fixed-point format by reducing a fraction length of the fixed-point format by the maximum bit shift value.

27. The method of claim 26, wherein the certain value is based on a number of the parameters in the t-th learning or inference process.

* * * * *